Jan. 31, 1956 J. C. COLLINS 2,732,786
ADJUSTABLE PLOW ASSEMBLY FOR TERRACING MACHINES
Filed Jan. 9, 1953 3 Sheets-Sheet 1
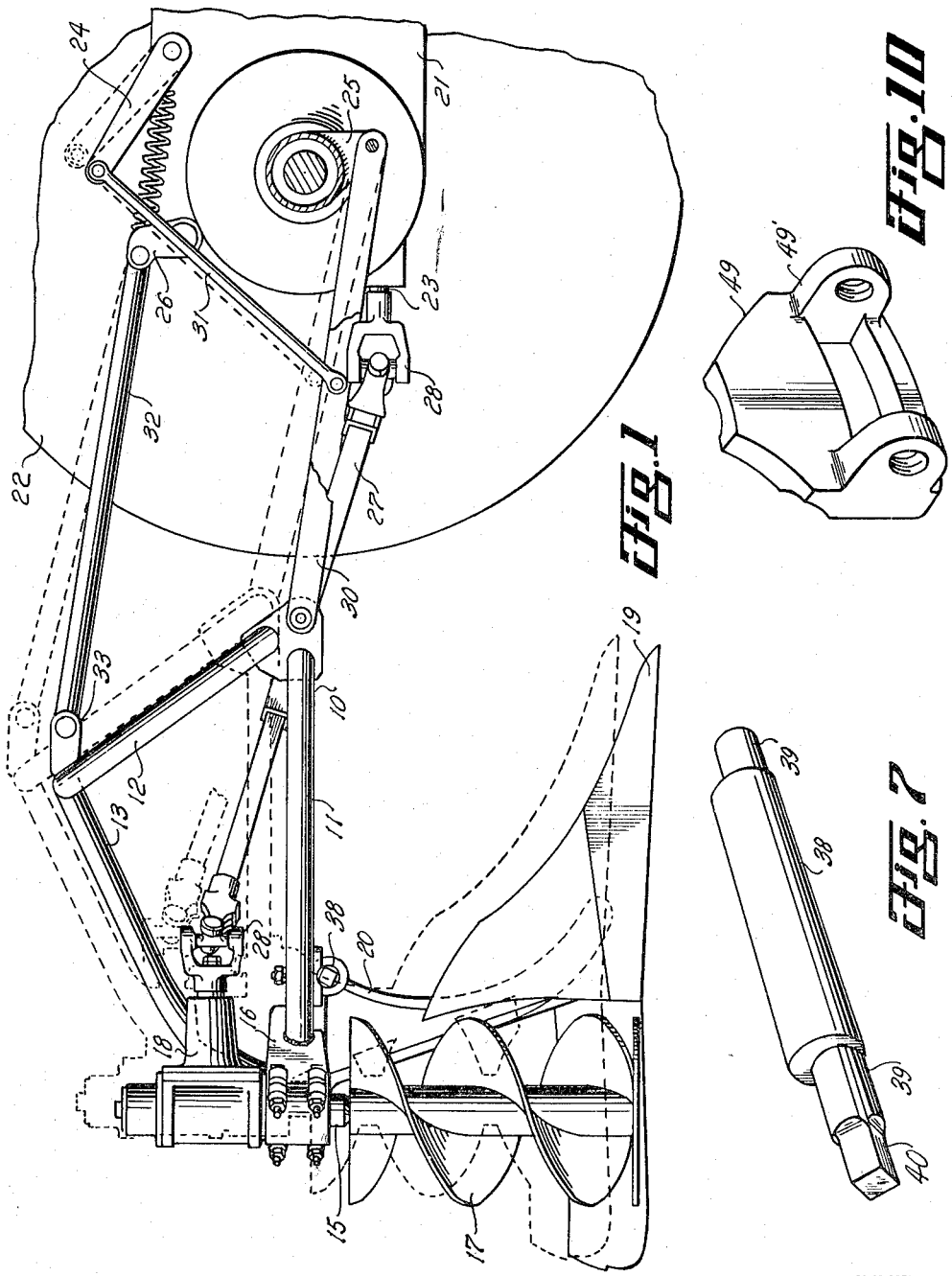
INVENTOR
Johnnie C. Collins
BY Schley & Schley
ATTORNEYS Jan. 31, 1956 J. C. COLLINS 2,732,786
ADJUSTABLE PLOW ASSEMBLY FOR TERRACING MACHINES
Filed Jan. 9, 1953 3 Sheets-Sheet 2
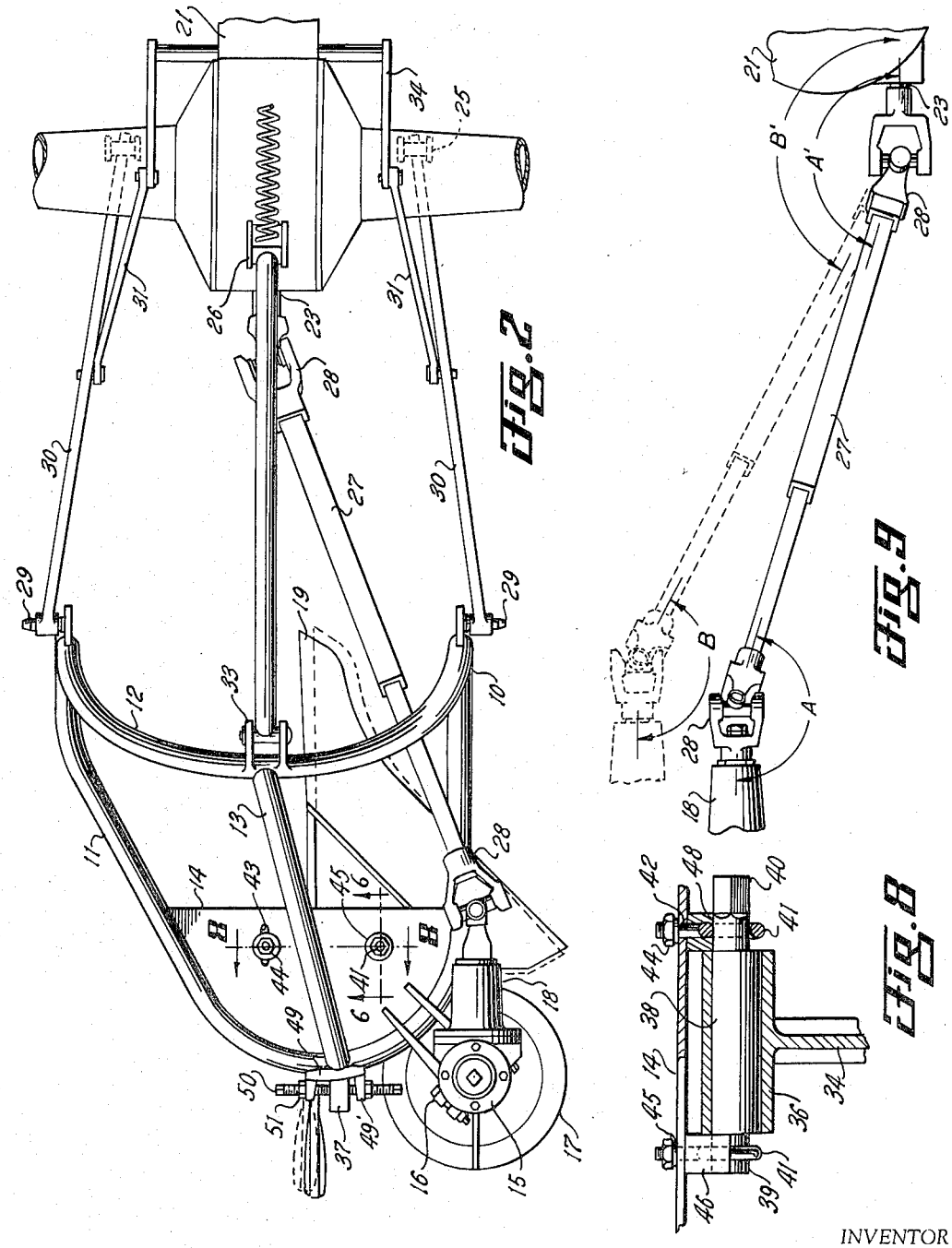
INVENTOR
Johnnie C. Collins
BY Ashley & Ashley
ATTORNEYS Jan. 31, 1956     J. C. COLLINS     2,732,786
ADJUSTABLE PLOW ASSEMBLY FOR TERRACING MACHINES
Filed Jan. 9, 1953     3 Sheets-Sheet 3
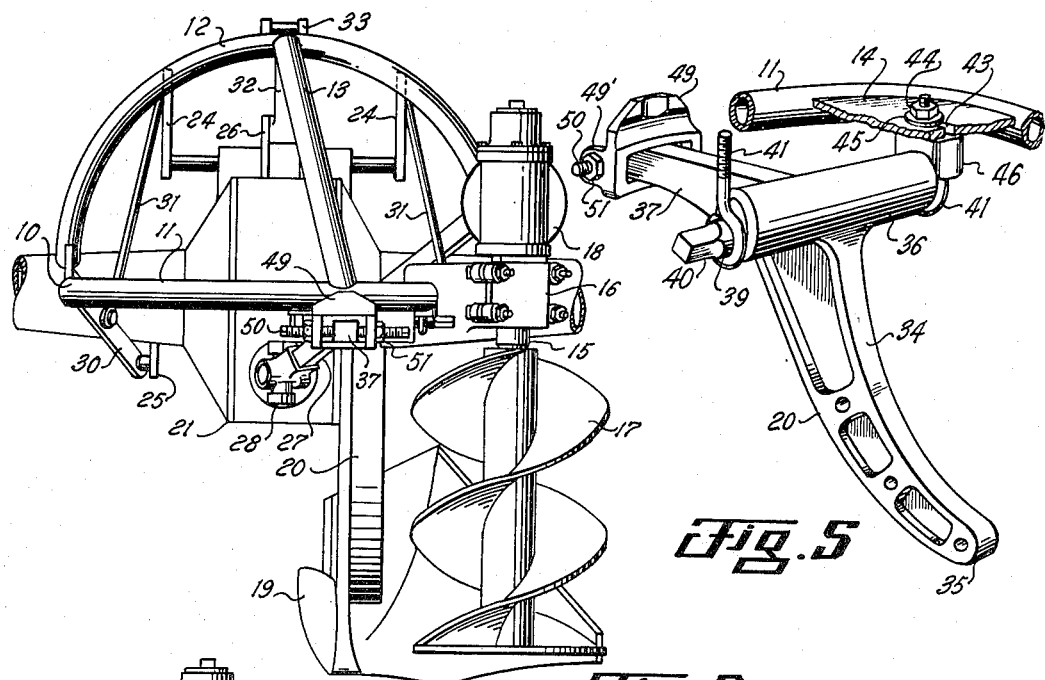
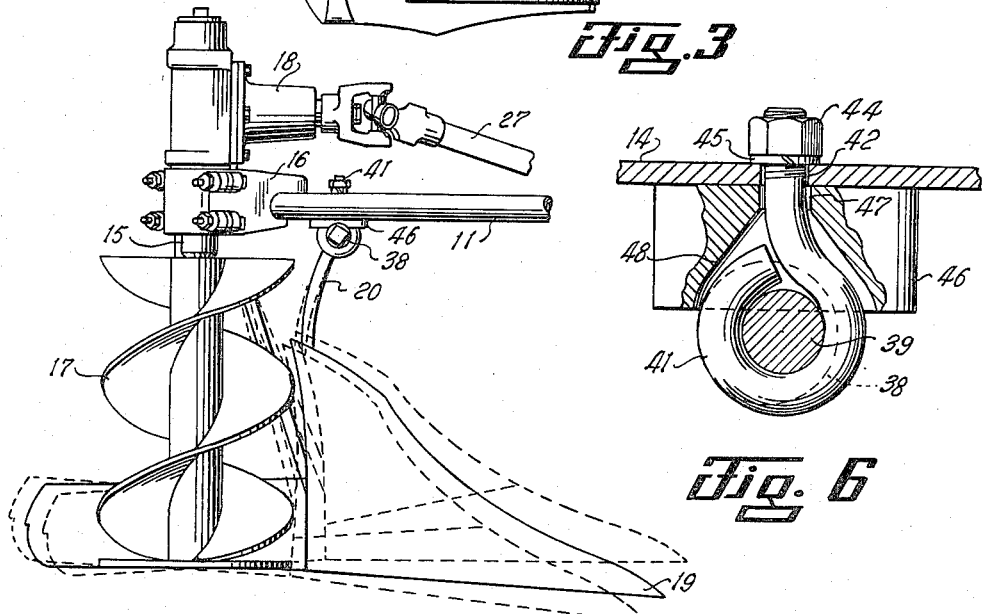
INVENTOR
Johnnie C. Collins
BY *Ehley & Ehley*
ATTORNEYS

United States Patent Office 2,732,786
Patented Jan. 31, 1956

2,732,786

ADJUSTABLE PLOW ASSEMBLY FOR TERRACING MACHINES

Johnnie C. Collins, Dallas, Tex., assignor to Servis Equipment Company, Dallas, Tex., a corporation of Texas Application January 9, 1953, Serial No. 330,461

3 Claims. (Cl. 97—240)

This invention relates to new and useful improvements in terracing machines.

One object of the invention is to provide an improved terracing machine having a coacting plow and soil throwing means adapted to be drivingly connected to a tractor and having a parallelogram connection therewith for maintaining and permitting movement of the machine in fixed angular relation to the tractor whereby strain and vibration of the drive connection are reduced to a minimum to prolong its durability.

Another object of the invention is to provide an improved terracing machine having a frame adapted to be connected by a parallelogram structure to the rear lift of a tractor for relative adjustable movement and power-driven soil throwing means operatively connected to the power take-off of the tractor by a telescoping drive shaft and universal joints, together with coacting plow means mounted on the frame whereby the machine may be adjusted vertically relative to said tractor without varying the angular relation of said machine to said tractor and to its power take-off and without placing a strain on the telescoping drive shaft and its universal joints so as to reduce wear and increase the life thereof.

A further object of the invention is to provide an improved terracing machine, of the character described, wherein the universal joints of the drive shaft undergo movement through equal angles upon movement of the machine relative to the tractor, due to the provision of the parallelogram structure, whereby said universal joints are maintained in the same relative position and rotate at equal velocities.

Still another object of the invention is to provide an improved terracing machine, of the character described, wherein the plow is mounted for transverse and vertical tilting adjustment relative to the frame and soil throwing means whereby said frame may be maintained in a fixed plane relative to the tractor and its power take-off.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevational view of a terracing machine having its frame connected to a tractor and to its rear lift in accordance with the invention, Fig. 2 is a top plan view of the machine and its connection to the tractor, showing the transverse adjustment of the plow in broken lines, Fig. 3 is a rear elevational view of the tractor, Fig. 4 is a side elevational view showing in broken lines the vertical adjustment of the plow longitudinally of the soil throwing means, Fig. 5 is a perspective view, partly in section, of the adjustable mounting of the plow, Fig. 6 is an enlarged, transverse, vertical, sectional view, taken on the line 6—6 of Fig. 2, Fig. 7 is an enlarged, perspective view of the eccentric pin for adjustably supporting the plow, Fig. 8 is an enlarged, transverse, vertical, sectional view, taken on the line 8—8 of Fig. 2, Fig. 9 is a side elevational view illustrating the relative positions of the universal joints of the drive shaft upon movement of the machine relative to the tractor, and Fig. 10 is an enlarged, perspective view of the clamp bracket supporting the plow.

In the drawings, the numeral 10 designates the frame of a terracing machine which may be tubular and which includes a substantially horizontal, U-shaped portion or member 11 having its forward free ends connected by a rearwardly and upwardly inclined yoke or frame member 12. An angular or curved reinforcing member 13 extends between the medial portions of the frame members 11 and 12, and a complementary, horizontal plate 14 is suitably secured to and within the rear arcuate portion of said frame member 11 (Fig. 2). The members 11, 12, 13 and 14 constitute an implement or tool hanger of rigid unitary construction. At one side of the frame member 11, preferably its right, an upright, rotatable soil throwing element 15 is suspended by a suitable clamp bracket 16. In addition to the conventional double helix blade 17 depending below the frame member, the soil throwing element 15 includes a right-angle gear drive 18 at its upper end above said frame member for transmitting rotation to the blade. As will be explained, a plow 19 is suspended by a depending bracket or beam 20 from the medial portion of the frame adjacent and at one side, preferably the left, of the element 15 and extends forwardly thereof.

The machine is adapted to be connected to the rear portion 21 of a tractor having ground wheels 22, a power take-off shaft 23, and a conventional power lift mechanism including levers 24, draw bar pivots 25 and intermediate hitch lugs 26. A telescoping drive shaft 27, having universal joints 28 at its ends, extends between and connects the power take-off shaft 23 to the gear drive 18 for transmitting rotation to the blade 17 of the soil throwing element 15. The front ends of the frame member 11 are provided with pivot pins 29 attached by a pair of arms or members 30 to the draw bar pivots 25. A pair of links 31 pivotally connect the intermediate portions of the arms 30 to the levers 24, and a top link member 32 pivotally connects the hitch lugs 26 to a pair of lugs 33 at the intermediate portion of the yoke member 12. As shown most clearly in Fig. 1, the links 30 and 32 are parallel and of equal length whereby the distance between the pivot pins 29 and lugs 33 is equal to the spacing between the draw bar pivots 25 and hitch lugs 26.

This arrangement provides a parallelogram structure whereby the terracing machine, its frame 10, element 15 and plow 19 are maintained in fixed angular relation to the tractor irrespective of its vertical movement or adjustment as shown by the broken lines (Fig. 1). The drive shaft 27 telescopes to permit and compensate for this relative adjustable movement and shaft of the gear drive 18 and the shaft 23 as well as the portions of the universal joints 28 connected to said shafts are maintained in parallel relation, whereby the torque remains substantially constant and unchanged. As a result, there is minimum vibration and wear of the drive shaft and its universal joints, the relative positions thereof upon adjustable movement of the terracing machine being shown most clearly in Fig. 9. Since the shaft 18 is always parallel to the shaft 23, the angles A and A' are equal and the angle B is equal to the angle B'.

Therefore, there is no variation in the relation of the shafts and the portions of the universal joints connected thereto.

Due to the fixed angular relation of the terracing machine to the tractor, said machine and its plow 19 as well as its other elements and members are disposed in parallel planes irrespective of its adjustable movement. In order to vary the angular relation of the plow so as to move its point upwardly or downwardly, the plow beam 20 is pivotally supported for movement in an arc about a horizontal axis. The plow beam includes a substantially upright and triangular body 34 having a forwardly-curved lower extremity 35 to which the plow is bolted or otherwise rigidly secured. A transverse bearing collar or sleeve 36 is provided at the front, upper end of the body 34 and said upper end extends substantially horizontally, terminating in a rear projection or tail 37.

As shown most clearly in Figs. 5–8, the bearing collar 36 is adapted to receive a cam shaft 38 having reduced end pins 39 alined with each other and eccentric of the longitudinal axis of the shaft. One of the pins 39 is of greater length and has angular wrench faces 40 on its extremity. The cam shaft 38 is suspended from the plate 14 by a pair of eye bolts 41 engaged upon the pins 39 and projecting upwardly through openings 42 and 43 in said plate. Suitable nuts 44 and washers 45 are carried by the upper ends of the bolts 41 so as to overlie the plate for supporting said eye bolts, cam shaft and plow beam. A clamp block 46, having a complementary bore 47 and an arcuate recess 48 in its lower surface, is confined upon each eye bolt between the plate and cam shaft pin with its recess in engagement with said pin (Fig. 6). The tail 37 of the plow beam body is confined by a slotted bracket 49, having rearwardly-projecting arms 49', secured to the underside, intermediate portion of the frame member 11 (Fig. 10). A set screw 50, carrying a jam nut 51, is screw-threaded through each arm 49' for bearing against and frictionally clamping the plow beam tail. Although the plow beam tail is clamped against movement by the set screws, said tail is supported by engaging in the slotted bracket.

In order to raise and lower the point of the plow, the set screws 50 are loosened and the nuts 44 are loosened to lower the cam shaft pins 39 out of engagement with the clamp block recesses 48 and permit turning of the cam shaft 38. Due to the eccentric relation of its pins, the cam shaft is raised or lowered upon rotation of said shaft so as to raise or lower the plow point by pivoting the plow beam 20 about the axis of the sliding pivotal support provided by the clamp bracket 49. The opening 43 is elongated or slotted longitudinally of the terracing machine and tractor to permit movement of the plow point to the right and left or toward and from the soil throwing member 15. Upon loosening of the eye bolt 41 engaged in the opening 43, the plow beam may be pivoted about the axis of the other eye bolt by rotatably adjusting the set screws 50. This arrangement permits fine adjustment of the plow point and permits use of the parallelogram structure described hereinbefore. As a result, the life of the drive shaft is prolonged without sacrificing the necessary adjustment of the plow.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a terracing machine, an implement hanger including a horizontal frame, an upright beam having a transverse bearing collar at its upper end, a transverse pivotal support connecting the upper end of the beam to the frame in spaced relation to the bearing collar, a cam shaft engaged in the collar, and upright pivotal supports connecting the ends of the cam shaft to said frame for relative rotation of said shaft and pivotal adjustment of said beam about the axis of the transverse support, one of the upright supports having adjustable connection with said frame for pivotal movement with said shaft and beam about the axis of the other upright support.

2. An implement hanger as set forth in claim 1 wherein the transverse pivotal support includes opposed transverse set screws carried by the frame and engaging opposite sides of the beam for confining said beam therebetween in adjusted positions.

3. In a terracing machine, an implement hanger including a frame, an upright beam having a transverse bearing collar at its upper end, a transverse pivotal support connecting the beam to the frame, a cam shaft engaged in the bearing collar and adjustably connected to said frame for relative rotation of the shaft and pivotal adjustment of the beam about the axis of the transverse support, an upright pivotal support connecting the cam shaft to said frame for pivotal adjustment of said beam about the axis of the upright support, and a coplanar projection at the upper end of said beam in spaced relation to said bearing collar, said transverse pivotal support including opposed transverse set screws carried by said frame and engaging opposite sides of the beam projection for confining said projection therebetween in adjusted positions of said beam.

References Cited in the file of this patent

UNITED STATES PATENTS

| 360,586 | Hanson | Apr. 5, 1887 |
| 663,977 | McNaughton | Dec. 18, 1900 |
| 797,289 | Kennedy et al. | Aug. 15, 1905 |
| 1,100,503 | Springer | June 16, 1914 |
| 1,729,969 | Shields | Oct. 1, 1929 |
| 2,414,072 | Taft | Jan. 7, 1947 |
| 2,557,637 | Danuser | June 19, 1951 |
| 2,578,127 | Collins | Dec. 11, 1951 |